(12) United States Patent
Wu et al.

(10) Patent No.: US 9,602,819 B2
(45) Date of Patent: Mar. 21, 2017

(54) DISPLAY QUALITY IN A VARIABLE RESOLUTION VIDEO CODER/DECODER SYSTEM

(75) Inventors: Hsi-Jung Wu, San Jose, CA (US); Xiaosong Zhou, Campbell, CA (US); Douglas Price, San Jose, CA (US)

(73) Assignee: APPLE INC., Cupertino, CA (US)

( * ) Notice: Subject to any disclaimer, the term of this patent is extended or adjusted under 35 U.S.C. 154(b) by 713 days.

(21) Appl. No.: 13/018,339

(22) Filed: Jan. 31, 2011

(65) Prior Publication Data

US 2012/0195376 A1    Aug. 2, 2012

(51) Int. Cl.
*H04N 7/32* (2006.01)
*H04N 19/105* (2014.01)
*H04N 19/59* (2014.01)
*H04N 19/577* (2014.01)

(52) U.S. Cl.
CPC ......... *H04N 19/105* (2014.11); *H04N 19/577* (2014.11); *H04N 19/59* (2014.11)

(58) Field of Classification Search
CPC .......................... H04N 7/26015; H04N 19/105
USPC ..................................................... 375/240.12
See application file for complete search history.

(56) References Cited

U.S. PATENT DOCUMENTS

| | | | | |
|---|---|---|---|---|
| 5,418,570 A * | 5/1995 | Ueno et al. | ............. | 375/240.14 |
| 5,436,665 A * | 7/1995 | Ueno et al. | ............. | 375/240.14 |
| 6,078,617 A * | 6/2000 | Nakagawa | ............. | F16B 31/00 |
| | | | | 375/240 |
| 6,249,549 B1 * | 6/2001 | Kim | ........................ | 375/240.21 |
| 6,259,738 B1 * | 7/2001 | Yamaguchi et al. | ...... | 375/240.21 |
| 6,370,192 B1 * | 4/2002 | Pearlstein et al. | ............ | 375/240 |
| 6,393,152 B2 * | 5/2002 | Takahashi et al. | ........... | 382/233 |
| 6,477,202 B1 * | 11/2002 | Takeuchi | ........... | H04N 21/2368 |
| | | | | 375/240.15 |
| 6,487,249 B2 * | 11/2002 | Kim | ...................... | G06T 3/4023 |
| | | | | 375/240.15 |
| 6,748,018 B2 * | 6/2004 | Sato et al. | ............... | 375/240.21 |
| 6,801,574 B2 * | 10/2004 | Takeuchi et al. | ........ | 375/240.15 |
| 7,130,443 B1 * | 10/2006 | Werner | ................ | H04N 19/467 |
| | | | | 375/E7.089 |
| 7,227,895 B1 * | 6/2007 | Wang | .................... | H04N 19/159 |
| | | | | 375/240.13 |
| 7,433,497 B2 * | 10/2008 | Chen | ............................. | 382/107 |
| 7,898,581 B2 * | 3/2011 | Tanizoe | ........................ | 348/241 |
| 8,126,052 B2 * | 2/2012 | Suzuki | ................... | H04N 19/00 |
| | | | | 375/240.02 |
| 8,160,149 B2 * | 4/2012 | Demos | ................. | H04N 19/597 |
| | | | | 375/240.16 |
| 8,264,565 B2 * | 9/2012 | Sakaguchi et al. | ........ | 348/222.1 |

(Continued)

*Primary Examiner* — William C Vaughn, Jr.
*Assistant Examiner* — Luis Perez Fuentes
(74) *Attorney, Agent, or Firm* — Baker Hostetler LLP; Robert L. Hails

(57) ABSTRACT

In a video coder/decoder system using variable resolution adaptation, decoder techniques provide a mechanism to changing resolution of coded lower-resolution video to a higher resolution for rendering. Coded video data of a low resolution frame may be decoded. A motion estimation search may be performed between the decoded low resolution frame and a cache of previously-stored high resolution video frames. If the motion estimation search generates one or more matches, high resolution video data of the decoded frame may generated as a derivation of matching data from the cached video frames.

34 Claims, 5 Drawing Sheets

(56) References Cited

U.S. PATENT DOCUMENTS

| | | | |
|---|---|---|---|
| 8,363,727 B2* | 1/2013 | Wang | H04N 19/00696 |
| | | | 375/240.16 |
| 8,428,116 B2* | 4/2013 | Kimoto | 375/240 |
| 8,761,239 B2* | 6/2014 | Imanaka | H04N 19/52 |
| | | | 375/240 |
| 2005/0169549 A1* | 8/2005 | Cha | H04N 19/63 |
| | | | 382/240 |
| 2007/0071104 A1* | 3/2007 | Kondo | H04N 19/159 |
| | | | 375/240.21 |
| 2007/0091997 A1 | 4/2007 | Fogg et al. | |
| 2007/0223582 A1 | 9/2007 | Borer | |
| 2008/0063054 A1 | 3/2008 | Ratakonda et al. | |
| 2009/0009660 A1 | 1/2009 | Kageyama et al. | |
| 2011/0026593 A1* | 2/2011 | New et al. | 375/240.12 |
| 2011/0050991 A1* | 3/2011 | Bellers et al. | 348/441 |

* cited by examiner

100

200

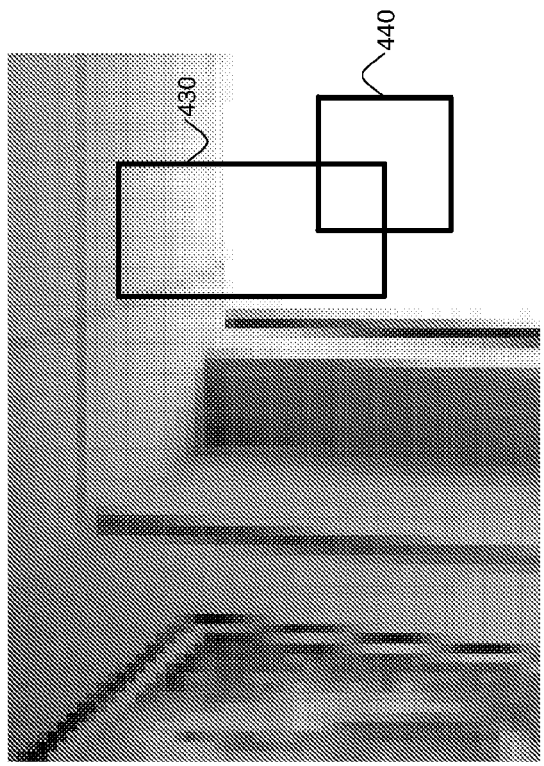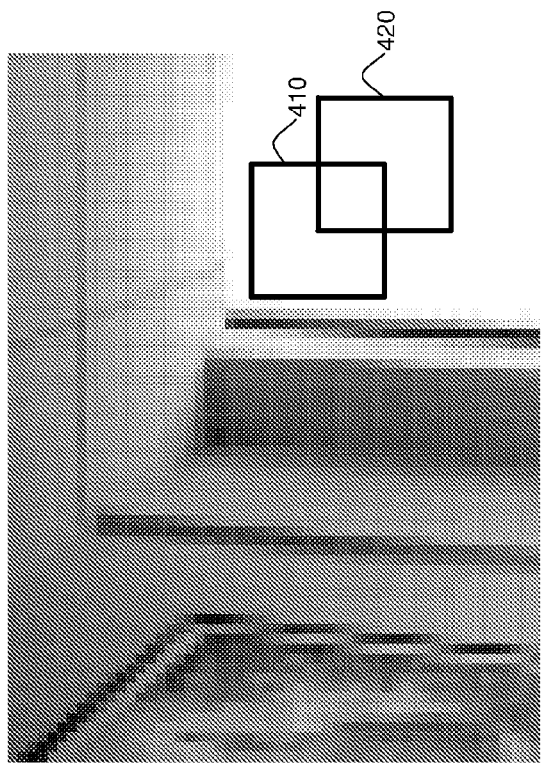
FIG. 4

500

DISPLAY QUALITY IN A VARIABLE RESOLUTION VIDEO CODER/DECODER SYSTEM

BACKGROUND

In video coder/decoder systems, a video encoder may code a source video sequence into a coded representation that has a smaller bit rate than does the source video and, thereby may achieve data compression. The encoder may code processed video data according to any of a variety of different coding techniques to achieve bandwidth compression. One common technique for data compression uses predictive coding techniques (e.g., temporal/motion predictive encoding). For example, some frames in a video stream may be coded independently (I-frames) and some other frames (e.g., P-frames or B-frames) may be coded using other frames as reference frames. P-frames may be coded with reference to a single previously coded frame and B-frames may be coded with reference to a pair of previously-coded frames, typically a frame that occurs prior to the B-frame in display order and another frame that occurs subsequently to the B-frame in display order. The resulting compressed sequence (bitstream) may be transmitted to a decoder via a channel. To recover the video data, the bitstream may be decompressed at the decoder, by inverting the coding processes performed by the encoder, yielding a received decoded video sequence. In some circumstances, the decoder may acknowledge received frames and report lost frames.

Modern coder/decoder systems often operate in processing environments in which the resources available for coding/decoding operations varies dynamically. Modern communications networks provide variable bandwidth channels to connect an encoder to a decoder. Further, processing resources available at an encoder or a decoder may be constrained by hardware limitations or power consumption objectives that limit the complexity of analytical operations that can be performed for coding or decoding operations. Accordingly, many modern coder/decoder systems employ a variety of techniques to constraint bandwidth consumption and/or conserve processing resources.

Video Resolution Adaptation ("VRA") is one such a technique used in video coding/decoding systems to manage bandwidth and/or resource consumption within the coder/decoder system. VRA is a technique that alters the resolution of images prior to being coded for bandwidth conservation. For example, a camera may output video data to an encoder at a predetermined resolution (say, 960×720 pixels) but an encoder may reduce this resolution to a lower resolution (ex., 320×240 pixels) to meet a performance constraint. Reducing the resolution of the image effectively reduces its size for coding and, therefore, contributes to reduced bandwidth when the resulting image is coded. Similarly, a reduced resolution image also is less complex to code than a full resolution image.

When a decoder receives and decodes such an image, it will generate a recovered image with reduced resolution. If the image is rendered on a display device and expanded to fit a larger display area than the reduced size (ex., 320×240 pixels to 960×640 pixels), it will appear blurry and will be perceived as having lower quality. Alternatively, it might be displayed at a reduced size—a 320×240 pixel window on a 960×640 pixel display—but it also will be perceived as having low quality even though it may appear relatively sharper than the expanded version.

Accordingly, there is a need in the art for a video coder/decoder system that takes advantage of the bandwidth and resource conservation that VRA techniques can provide but still provide high image quality. There is a need in the art for a video coder/decoder system that allows images to be coded as low resolution images and be displayed at a decoder as if they were high resolution images.

BRIEF DESCRIPTION OF THE DRAWINGS

FIG. 4 illustrates exemplary video data parsed into blocks according to different embodiments of the present invention.

DETAILED DESCRIPTION

Embodiments of the present invention provide techniques for changing resolution of coded video in which a decoded video frame is upconverted to a high resolution. A motion estimation search may be performed between the upconverted frame and a cache of previously stored video frames having high resolution. If the motion estimation search generates a match, video data of the upconverted frame may be blended with matching data of the cached video frames to generate an output frame at high resolution.

Figure 1:
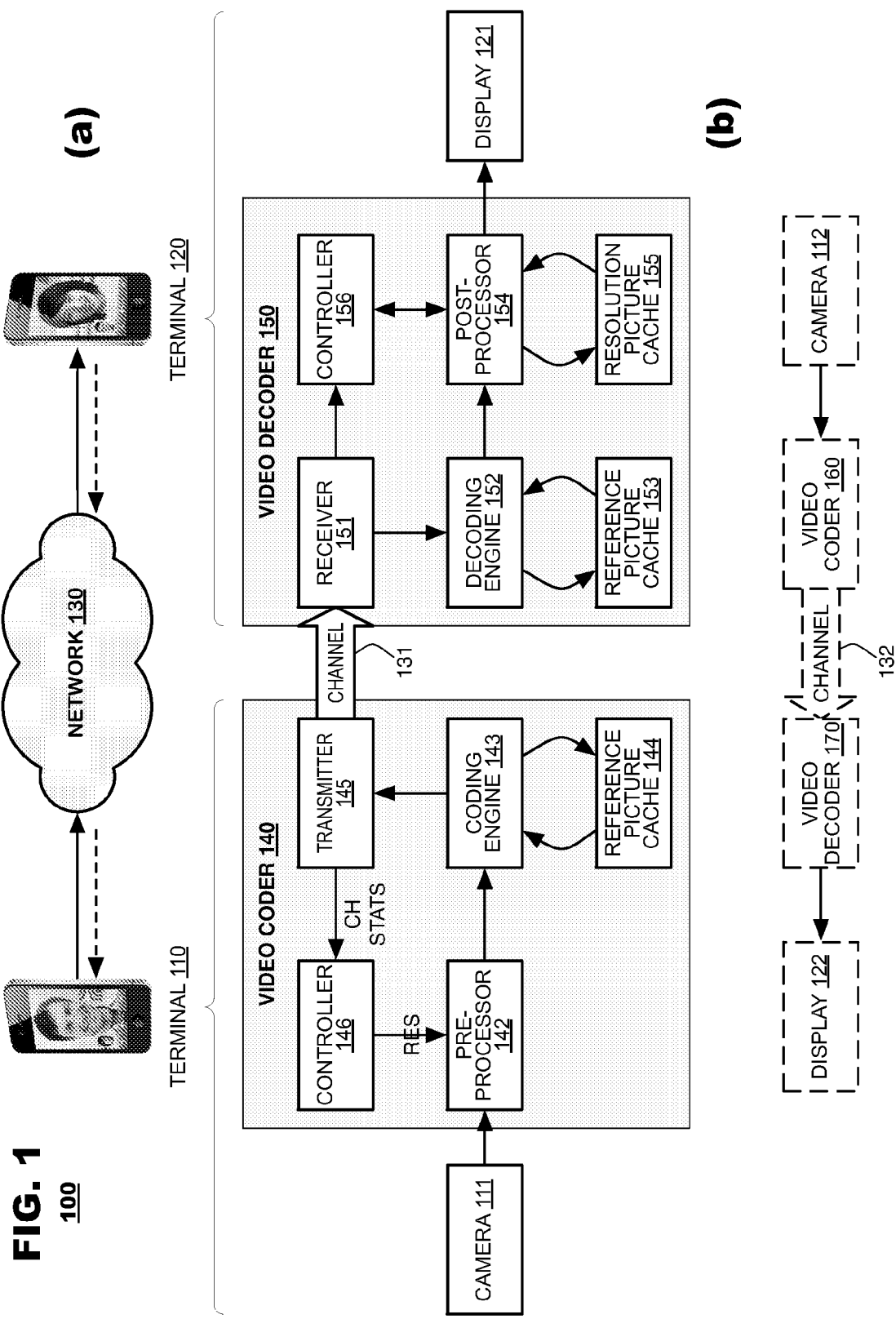
FIG. 1 is a simplified block diagram of a video coding system according to an embodiment of the present invention.

FIG. 1(*a*) illustrates a simplified block diagram of a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, decode the coded data and display video data recovered therefrom. As illustrated in FIG. 1(*a*), the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment. The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

FIG. 1(*b*) further illustrates a functional block diagram of a video coder and decoder 140, 150 operable within the system 100. Specifically, FIG. 1 illustrates a video coder 140 for terminal 110 and a video decoder 150 for terminal 120. The video coder 140 may code video data captured at a camera 111 of terminal 110 and may deliver the coded data to a channel 131 provided by the network 130. The video decoder 150 may receive the coded video data from the channel 131, decode the coded video data and render the recovered video data at a display 121 of the second terminal 120. The functional blocks illustrated in FIG. 1 support video coding and deciding in one direction only. For bidirectional communication, terminal 120 may include functional blocks 160 for video coding of locally-captured video and terminal 110 may include functional blocks 170 for decoding of coded video data received from the terminal 120 via the network 130.

As illustrated, the video coder 140 may include a pre-processor 142, a coding engine 143, a reference picture cache 144 and a transmitter 145. The pre-processor 142 may accept source video from an image capture device 111 such as a camera and may perform various processing operations on the source video to condition it for coding. The coding engine 143 may perform bandwidth compression operations on the pre-processed source video to reduce spatial and/or temporal redundancies therein. The coding engine 143 may output coded video data to the transmitter 145, which may format the data for transmission over the channel 131 and delivery to the terminal 120. As part of its operation, the coding engine 143 also may code new frames of video data according to motion prediction techniques using data stored in the reference picture cache 144 as a prediction reference. The coding engine 143 further may decode coded video data of the reference frames for storage in the reference picture cache 144.

The video coder 140 may include a controller 146 to manage operation of the video coder 140. In one embodiment, the controller 146 may select a resolution of video data to be coded. The camera 111 may generate video at a predetermined resolution, for example, 960×720 pixels per frame. The controller 146 may select a different resolution than the resolution of the camera for coding, for example, 320×240 pixels. Indeed, the controller may reconfigure the resolution of the input video data dynamically, cycling among a number of different resolutions in response to changing coding conditions. The preprocessor 142 may scale the input data in response to control signals from the controller 146 to output video data to the coding engine 143 at the resolution identified by the controller 146. The coding engine 143, therefore, may code video data at the selected resolution.

The pre-processor 142 may perform a variety of other video processing operations on the source video output from the camera to condition the source video for coding. The pre-processor 142 may include an array of filters (not shown) such as de-noising filters, sharpening filters, smoothing filters, bilateral filters and the like that may be applied dynamically to the source video based on characteristics observed within the video. The pre-processor 142 may include its own controller (not shown) to review the source video data from the camera and select one or more of the filters for application. Typically, the pre-processor 142 conditions the source video data to render bandwidth compression more efficient or to preserve image quality in light of data losses that may be incurred as the coding engine 143 operates.

The coding engine 143 may code input video data according to a variety of different coding techniques to achieve bandwidth compression. The coding engine 143 may compress the images by a motion-compensated prediction. Frames of the input video may be assigned a coding type, such as intra-coding (I-coding), uni-directionally predictive coding (P-coding) or bidirectionally predictive coding (B-coding). The frames further may be parsed into a plurality of pixel blocks and may be coded by transform coding, quantization and entropy coding. Pixel blocks of P- and B-coded frames may be coded predictively, in which case, the coding engine may calculate motion vectors identifying pixel blocks of decoded frames stored in the reference picture cache 144 that serve as predictions of the pixel blocks being coded and may generate prediction residuals prior to engaging the transform coding. In an embodiment, the video encoder may operate according to coding protocols defined by ITU H.263, H.264 and the like.

The transmitter 145 may transmit the coded video data to the channel 131. In so doing, the transmitter 145 may multiplex the coded video data with other data to be transmitted such as coded audio data and control data (provided by processing sources that are not illustrated in FIG. 1). The transmitter 145 may format the multiplexed data into a format appropriate for the network 130 and transmit the data to the network.

As part of its operation, the transmitter 145 may observe performance of the network and develop statistics on such performance. For example, the transmitter 145 may estimate the bandwidth of a channel 131 that the network 130 can provide to the terminal 110. In many networking applications, network channels provide variable data rates for transmission, which change without notice to the transmitting terminals. The transmitter 145 may receive indicators from the channel 131 or from the far-end terminal 120 identifying transmission failures, transmission latencies and other indicators of network performance from which the transmitter 145 may estimate network performance. The transmitter 145 may provide channel statistics to the controller 146. The controller 146, in turn, may alter its selection of coding parameters to match the bit rate of coded data output by the coding engine 143 to the estimated bandwidth of the channel 131.

The video decoder 150 may include a receiver 151, a decoding engine 152, a reference picture cache 153, a post-processor 154, a resolution picture cache 155 and a controller 156. The decoding engine 152 may decode coded video data received via the channel 131 with reference to reference pictures stored in the reference picture cache 153. The decoding engine 152 may output decoded video data to the post-processor 154, which may perform additional operations on the decoded video data to condition it for display. Decoded video data of reference frames also may be stored to the reference picture cache 153 for use during decoding of subsequently received coded video data. As part of its operation, the post-processor 154 may change resolution of low resolution frames using stored pictures in the resolution picture cache 155 as a basis for correction, as discussed below.

The decoding engine 152 may perform decoding operations that invert coding operations performed by the coding engine 143. The decoding engine 152 may perform entropy decoding, dequantization and transform decoding to generate recovered pixel block data. Quantization/dequantization operations are lossy processes and, therefore, the recovered pixel block data likely will be a replica of the source pixel blocks that were coded by the video encoder 140 but include some error. For pixel blocks coded predictively, the transform decoding may generate residual data; the decoding engine 152 may use motion vectors associated with the pixel blocks (which may be implied in some cases) to retrieve predicted pixel blocks from the reference picture cache 153 to be combined with the prediction residuals. Decoded pixel blocks may be reassembled into frames and output to the post-processor 154.

In an embodiment of the present invention, the post-processor 154 may increase resolution of decoded low resolution frames by using prior decoded high reference frames as bases for correction. Prior to rendering of a decoded low resolution frame, the decoder may perform motion estimation analyses between the low resolution frame and previously decoded high resolution frames. If the motion estimation analysis identifies a match between the low resolution frame and one or more high resolution frames, the post-processor 154 may generate an upsampled version of the low resolution frame with reference to the matching portions of the high resolution frames. As discussed below, the high resolution version of the low resolution frame likely will have higher image quality than would be achieved by other techniques.

The post-processor 154 may perform additional video processing to condition the recovered video data for rendering, commonly at a display device. Typical post-processing operations may include applying deblocking filters, edge detection filters, ringing filters and the like. The post-processor 154 may output recovered video sequence from rendering on the display 121 or, optionally, stored to memory for later retrieval and display.

As discussed, the camera 111, video coder 140, video decoder 150 and display 121 support delivery of video data in only one direction, from terminal 110 to terminal 120. The principles of the present invention may be extended to bidirectional exchange of video data, in which case these functional blocks may be replicated to support delivery of video data from terminal 120 to terminal 110. Thus, the terminal 120 may include its own camera 112 and video coder 160 and the terminal 110 may include a video decoder 170 and display 122. Although not illustrated in FIG. 1(*b*), the video coder 160 and video decoder 170 may be provisioned similarly to their counterparts in the first direction—the video coder 140 and video decoder 150. Thus, the video coder 160 may selectively change resolution of video data output from the camera prior to being coded and the vide decoder 170 may recover high resolution content for decoded low resolution frames as discussed herein. Although similarly provisioned, the video encoder/decoder pairs (140/150 and 160/170) may operate independently of each other. Therefore, pre-processing operations 142 and post-processing operations 154 of a first video encoder/decoder pair 140/150 may be selected dynamically with regard to the video content being processed by that pair. Pre-processing operations and post-processing operations of the second video encoder/decoder pair 160/170 may be selected dynamically with regard to the video content being processed by the second pair and without regard to the video content being processed by the first pair 140/150. Thus, any resolution control of the first coder 140 may be performed independently of resolution control of the second coder 160.

Figure 2:
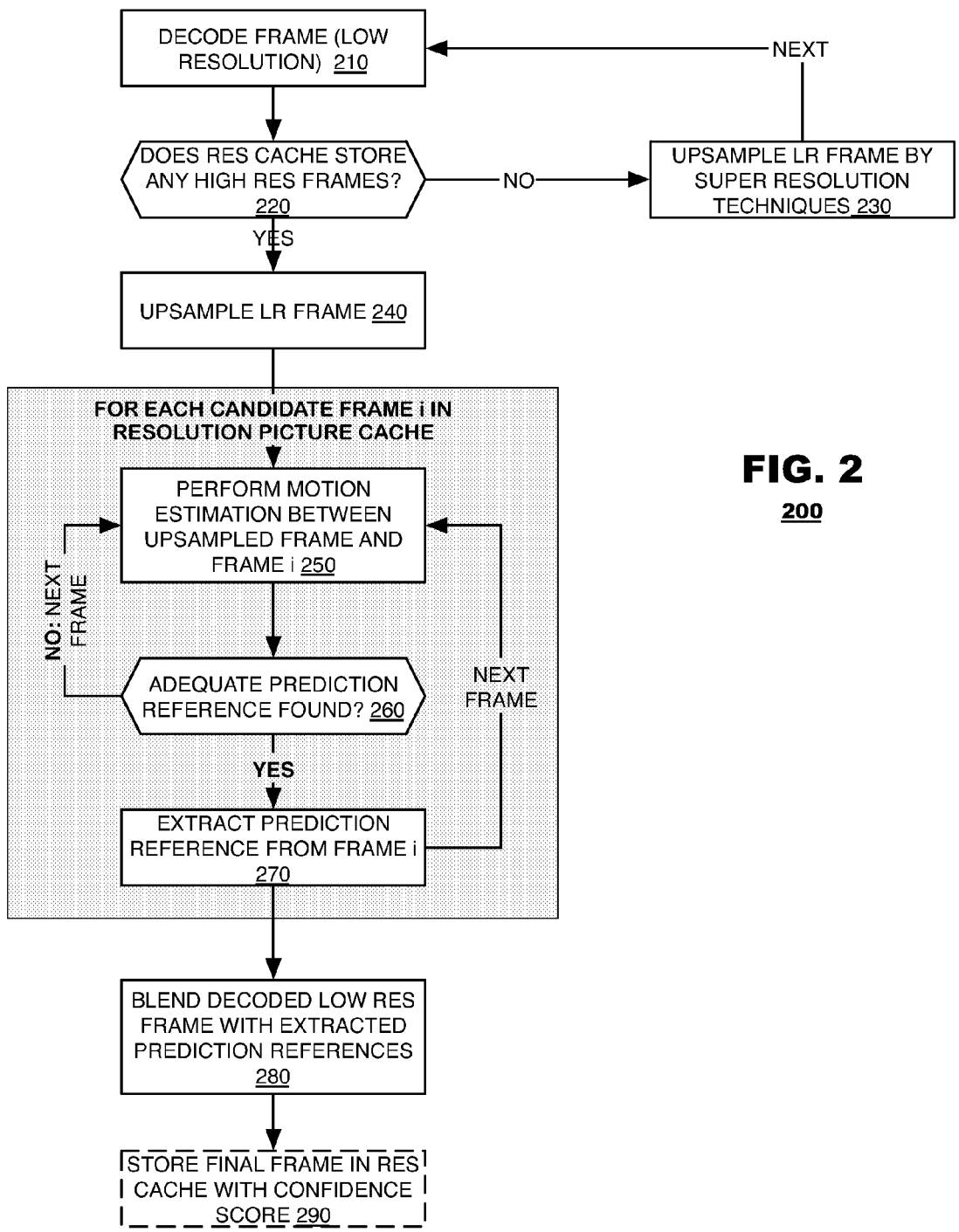
FIG. 2 illustrates a method according to an embodiment of the present invention.

FIG. 2 illustrates a method 200 according to an embodiment of the present invention. The method may find application in post-processing of decoded low resolution frames to generate high resolution output frames. The method may begin following decoding of the low resolution frame (box 210). The method 200 may determine whether the resolution picture cache stores any high resolution frames for analysis (box 220). If not, the method 200 may attempt to generate a high resolution copy of the low resolution frame by another means, for example, super-resolution image reconstruction techniques (box 230) and may store the upsampled frame in the resolution cache. If so, the method may upsample the decoded low resolution frame to generate a high resolution frame (box 240) and perform motion estimation analysis with respect to the store frames in the resolution picture cache.

The motion estimation process may be performed iteratively over multiple frames in the cache. On each iteration, the method 200 may perform motion estimation between the upsampled decoded frame and corresponding frame in the resolution picture cache (box 250). The motion estimation may be performed using predetermined portions of the upsampled frame as a basis for the motion estimation search, for example, blocks of the upsampled image. The motion estimation search may accommodate artifacts that may be induced in the video sequence by, for example, changes in lighting, camera motion and/or rolling shutter artifacts induced by image sensors. Each time the method performs motion estimation with a candidate frame, the method 200 may determine whether an adequate prediction reference is found (box 260). If so, the method 200 may extract portion(s) of the reference frame that provide an adequate prediction reference for later use (box 270). If not or at the conclusion of the operations of box 270, the method may return to box 250 for another iteration. The motion estimation process may continue until it has considered all candidate frames in the resolution picture cache.

After the motion estimation analysis has considered all candidate frames in the reference picture cache, the method 200 may generate a final frame for the decoded frame by blending the upsampled version of the decoded frame with extracted portions of the reference frames. The blending may generate a high resolution frame, which may be rendered on a display as the decoded frame. Optionally, the final frame may be stored in the resolution picture cache for use in motion estimation for later decoded frames (box 290).

Figure 3:
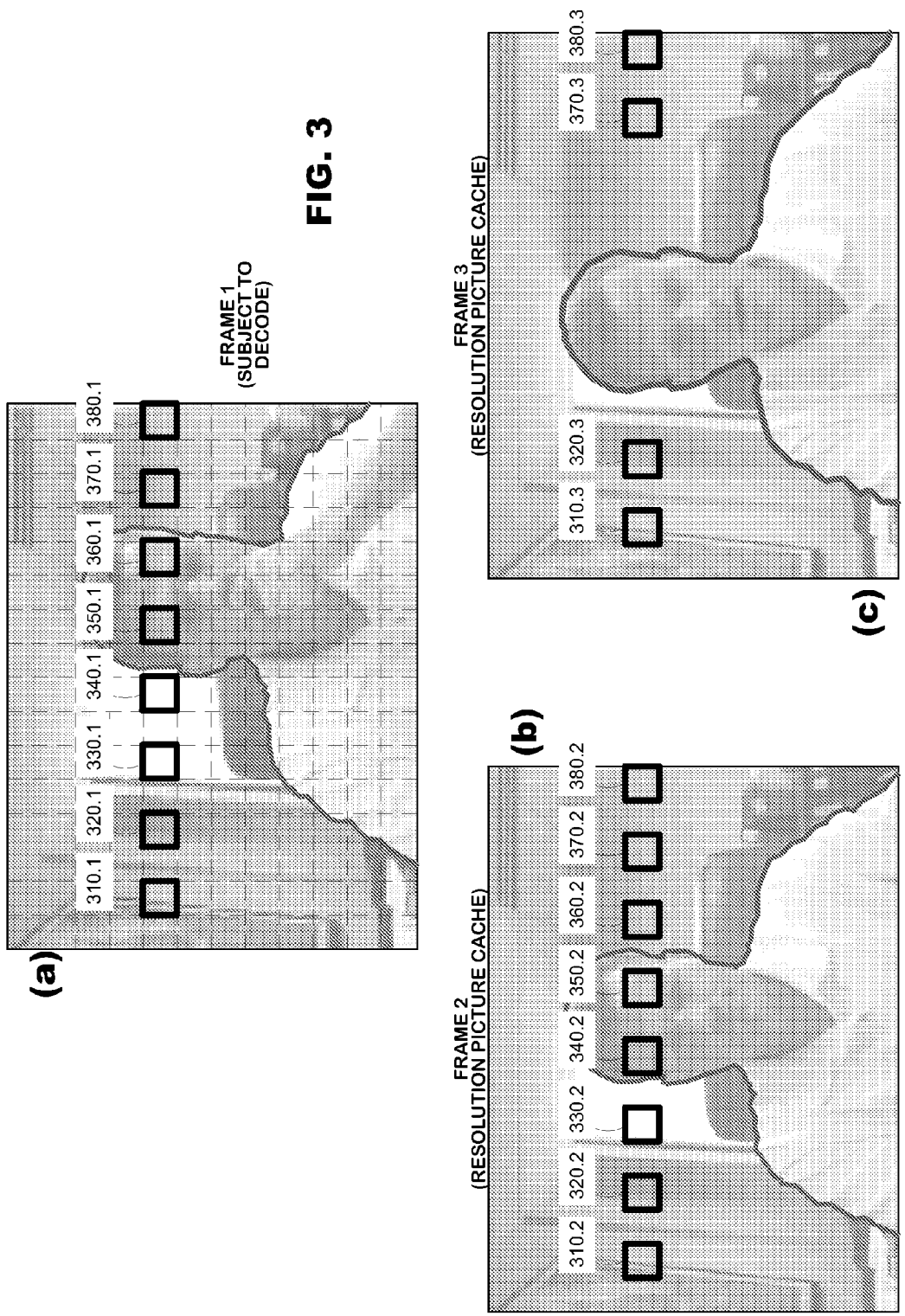
FIG. 3 illustrates an exemplary set of video data on which the methods of the present invention may operate.

FIG. 3 illustrates an exemplary set of video data on which the method of FIG. 2 may operate. FIGS. 3(*a*)-(*c*) each illustrate image data of a user in a videoconferencing environment in which the user may move with respect to a relatively still background image. The user's silhouette is highlighted in each figure to illustrate exemplary differences between each frame. In this example, frame 1 (FIG. 3(*a*)) represents a decoded frame on which the method may operate. Frame 1 is illustrated as having been decoded and upsampled. Frames 2 and 3 (FIGS. 3(*b*) and 3(*c*)) may represent high resolution frames that are stored in the resolution picture cache. Only two high resolution frames are illustrated in this example but, in practice, the resolution picture cache may store many more candidate frames.

FIG. 3(*a*) further illustrates frame 1 as having been parsed into a plurality of blocks (examples shown as blocks 310.1-380.1), which may be used for motion estimation analysis. That is, for each block in frame 1 (say block 310.1), the method may search for a similarly sized block in the candidate reference frame (say, block 310.2 in frame 2) that best matches content of the block. The search process may generate a motion vector, representing spatial displacement between the location of the block 310.1 in frame 1 and the location of the matching block 310.1 in frame 2. The search process also may generate an error value representing content differences between blocks 310.1 and 310.2.

In the example of FIG. 3, background elements are likely to remain somewhat still in the field of view. Accordingly, the motion estimation processes may identify matches among background elements of the scene. Thus, in the illustrated examples, the method is likely to identify strong matches between blocks 310.1-330.1 and 370.1-380.1 in frame 1 and co-located blocks 310.2-330.2 and 370.2-380.2 in frame 2. Further, the method is likely to identify strong matches between blocks 310.1-320.1 and 370.1-380.1 in frame 1 and co-located blocks 310.2-320.2 and 370.3-380.3 in frame 3. Strong matches are likely to be identified for other background elements of the scene where motion is relatively low.

The method also may operate on foreground elements of the scene, attempting to find prediction matches. Based on similarity of visual content, the method might find a match between blocks 350.1 and 360.1 of frame 1 and blocks 340.2 and 350.2 of frame 2. If matches are detected, the motion estimation search may generate data representing the motion observed between the blocks of each frame and content differences between the source blocks (350.1, 360.1) and the matching blocks (340.2, 350.2).

At the conclusion of the motion estimation process, many blocks of the frame being decoded may be matched with blocks of one or more frames stored in the resolution picture cache. For each match, the method generates the location of matching data via the motion vector and an error value representing a degree of similarity or dissimilarity between the blocks. The method may use the motion vector and/or error value to control blending operations as it generates the final output for the decoded frame.

As illustrated in FIG. 3, motion estimation may be performed on a plurality of blocks of the frame being decoded. In the example of FIG. 3, the frame being decoded is parsed into a plurality of identically sized non-overlapping blocks 310.1-380.1. The principles of the present invention are not so limited. FIG. 4 illustrates other embodiments that may find application with the present invention. As shown in FIG. 4(*a*), for example, the frame may be parsed into a plurality of identically sized overlapping blocks such as blocks 410 and 420. As shown in FIG. 4(*b*), the frame may be parsed into a plurality of blocks that have mutually different sizes, such as shown in blocks 430 and 440.

The motion estimation search may be performed as a generalized search between the upsampled decoded frame and high resolution frames stored in the resolution cache. In an embodiment, the motion estimation search may be assisted by pixel block motion vectors provided in the decoded video data of the current frame, which identify a reference frame stored in the reference picture cache 153 (FIG. 1) and a location in the reference frame from which prediction data is to be extracted. In this embodiment, the motion estimation search (FIG. 2) may use the motion vectors to identify a corresponding block in the resolution picture cache 155 as an extraction block for use in resolution adaptation.

Following operation of the motion estimation process, each block of the frame may be matched to any number of blocks in the resolution picture cache. It is possible that some blocks will not be matched to any block in the resolution picture cache, in which case no blending will occur for that block—the upsampled video data for the non-matched block may be output to the frame without modification. Other blocks may be matched to one or more blocks from the resolution picture cache. For these blocks, blending may occur.

Blending may occur in any number of ways. In a first embodiment, image content of the matching blocks from the resolution picture cache and the upsampled video data of the decoded block may be merged by an averaging of video content. That is, the value of each pixel in the source block may be averaged with pixel values from the blocks extracted from the resolution picture cache. In another embodiment, averaging may occur via a weighted average in which each block's contribution to the final is weighted according to the error observed between the source block and extracted blocks. Blocks with relatively higher estimated errors may be assigned a corresponding lower contribution (weight) than blocks with lower estimated errors. Alternatively, weighted averaging may be performed on the basis of motion vectors derived from the motion estimation process with relatively higher contributions assigned to blocks with low motion and relatively lower contributions assigned to extracted blocks with relatively high motion. And, of course, weighting can be varied based on a combination of estimated error and motion.

Blending further can be performed as a weighted combination of frequency components of the target and reference regions. For example, image data of the source blocks and extracted blocks may be translated into frequency coefficients by, for example, a discrete cosine transform ("DCT") or a wavelet transform. Thereafter, coefficients of the various blocks may be averaged to generate a set of coefficients for a final block. Averaging may be performed as a non-weighted average or, alternatively, as a weighted averaging based on estimated errors during the motion estimation. Again, in the case of weighted averaging, blocks with relatively higher estimated errors may be assigned a corresponding lower contribution (weight) than blocks with lower estimated errors. Alternatively, weighted averaging may be performed on the basis of motion vectors derived from the motion estimation process with relatively higher contributions assigned to blocks with low motion and relatively lower contributions assigned to extracted blocks with relatively high motion. And, of course, weighting can be varied based on a combination of estimated error and motion. Thereafter, the final block may be transformed back to pixel values via an inverse DCT or inverse wavelet transform.

In another embodiment, blending may involve omitting the upsampled data of the decoded frame from the final block. In this embodiment, the block data of the decoded frame may be assigned a weight of zero when calculating data of the final block. A post-processor may determine to omit the upsampled data of the decoded frame based on certain triggering conditions, for example, when the motion estimation process generates a number of matches in the resolution cache in excess of a predetermined threshold number, when estimated errors obtained by the motion estimation process are lower than another threshold number or when estimated motion vectors obtained by the motion estimation process are lower than a different threshold number. In each case, the threshold values used for comparison can be programmed or even varied dynamically to meet coding objectives.

In circumstances such as shown in FIG. 4 where motion estimation is performed over one or more overlapping blocks, blending processes may be performed independently for each of the blocks 410, 420. Results obtained from each of the blocks may be blended together as a final blending operation before outputting the frame for rendering. The overlapping nature of the blocks and the blending operations can contribute to reduction of any image artifacts that might be observable in systems that employ non-overlapping blocks for such processing.

In a further embodiment, the blending process may be used in conjunction with a denoising filter to reduce noise in a rendered image.

As discussed above, blended high resolution frames may be stored in the resolution cache for use in decoding later-received frames. Optionally, the frames may be stored with a confidence score identifying a relative weight assigned to the decoded frames. The confidence scores also may be used as a weighting factor in the blending process.

Confidence scores may estimate a level of visual quality for an associated frame. The confidence scores may be determined dynamically based on a variety of factors. A decoded high resolution frame (one that need not be upsampled), for example, may be assigned a relatively high confidence score. Decoded high resolution frames may be assigned different scores based on other indicators of frame quality. In one embodiment, for example, a decoded high resolution frame that was coded with a relatively low quantization parameter may be stored with a higher confidence score than a high resolution frame that was coded with a higher quantization parameter. Similarly, decoded high resolution frames with higher bit allocations may be assigned higher confidence scores than other high resolution frames with lower bit allocations.

Confidence scores also may be assigned to decoded low resolution frames. In a first embodiment, a video decoder may decode frames at a variety of resolutions. For example, a coding/decoding system may code and decode frames at one of five different candidate resolutions. The decoded frames of each resolution may be upconverted to a highest resolution through the techniques illustrated in FIG. 2. In this embodiment, the decoded frames may be assigned confidence scores corresponding to the resolution at which the frames were coded. A frame coded (and, thus, decoded) at a lowest resolution may be assigned a lowest score. Frames coded and decoded at intermediate resolutions may be assigned intermediate confidence scores. And, as described above, frames coded and decoded at the highest resolution may be assigned the highest scores respectively.

Confidences scores further may be assigned based on prediction references used during decoding. In a first embodiment, confidence scores may be assigned to a decoded frame based on the resolution of the frame(s) that were used as reference frames during predictive coding/decoding. If a decoded frame points to high resolution reference frames during decoding, the decoded frame may be assigned a relatively higher confidence score than other decoded frames that point to low resolution reference frames during decoding. Similarly, a confidence score may be assigned based on the estimated quality of prediction supplied by the reference frame. If a decoded frame is well predicted by a high resolution reference frame, the decoded frame may be assigned a relatively high confidence score. By contrast, if a decoded frame is poorly predicted by a high resolution reference frame, the decoded frame may be assigned a lower confidence score. To estimate the quality of predictive coding, a method may estimate a level of residual coefficients that are generated following prediction. Residual coefficients represent differences between source frame data and predicted frame data in a predictive coding system.

Confidence scores also may be assigned based on a type of predictive coding that was applied to a decoded frame. In many coding systems, a frame may be assigned coding based on intra-coding techniques (colloquially, an "I" coded frame), uni-directionally predictive coding techniques (a "P" coded frame) or bidirectionally predictive coding techniques (a "B" coded frame). I-coded frames are coded and decoded without reference to any other frame whereas P- and B-coded frames are coded and decoded respectively with reference to one or two previously-coded reference frames. Frames coded according to I techniques often have higher bit rates and higher visual quality than frames coded according to P or B techniques. Relatively higher confidence scores may be assigned to I-coded frames than to P- or B-coded frames.

In a further embodiment, confidence scores may be based on a quantization parameter assigned to the frame during coding. During video coding, transform coefficients generally are quantized (divided) by a quantization parameter. Quantization may cause some coefficients to be set to zero, which induces high efficiency entropy coding at the cost of data loss. Confidence scores may be reduced for frames that have relatively high quantization parameters and may be lowered for frames that have relatively low quantization parameters. In this embodiment, the confidence score may be set based on a frame-Qp, which is assigned to a frame as a whole by an encoder. Alternatively, the confidence score may be based on an average of Qp's used for all pixel blocks of the frame, which may occur if an encoder changes quantization parameters used for individual pixel blocks.

Confidence scores may be assigned by an encoder in another embodiment of the present invention. In this embodiment, an encoder may maintain its own cache of decoded reference pictures that are used in motion compensated prediction. The encoder may run the methods of FIG. 2 or FIG. 5 (discussed below) locally, using decoded frame data. The encoder further may compute errors that arise from high resolution frames obtained by these methods by comparing the final high resolution frames to corresponding frames of source video. The encoder may include a confidence score identifier in the coded bitstream that reflect the computed errors. Frames with relatively low errors may be assigned high confidence scores and frames with high errors may be assigned low confidence scores. When the decoder decodes the coded video data and runs the methods locally, it may store the high resolution frame obtained therefrom in the reference cache with the confidence score provided by the encoder.

In another embodiment, confidence scores may be generated via combinations of the foregoing techniques. For example, default confidence scores may be generated based on frame types or based on the types of reference frames used during coding but the default scores may be refined by estimation of coding quality. After evaluation of all the candidate factors that contribute to the confidence score, the system may generate an aggregate confidence score and store it in the resolution picture cache with its associated frame.

Confidence scores also may vary over time. After a final rendered image is stored in the resolution cache, it may be searched as part of the motion estimation search process as other decoded frames are converted to high resolution content. In an embodiment, if a stored frame is identified as a match and used to upconvert another decoded frame to high resolution for rendering, the confidence score of the stored frame may be increased by a predetermined factor. By extension, confidence scores of other frames may be decreased at a predetermined rate as decoded frames are processed for upconversion. Some frames stored in the resolution cache may correlate strongly to decoded frames as they are processed while others may not. The frames that correlate strongly may have their confidence scores increased over time while other frames that do not correlate with the decoded frames may have their confidence scores decreased over time.

In another embodiment, a frame may have multiple confidence scores, each associated with different spatial regions of the frame. For example, the method may distinguish between different regions based on the quantization parameters used during coding. Regions coded with a first, relatively low quantization parameter may be assigned a first confidence score, which reflects the relatively high fidelity of coding applied to that region. Other regions of the frame coded with high quantization parameters may be assigned different confidence scores which reflect lower quality of coding applied to it. Similarly, the method may distinguish between regions based on the number of reference frames that match to them during the motion estimation search. A region with very few matches may have a lower confidence score than a region with a large number of matches.

Figure 5:
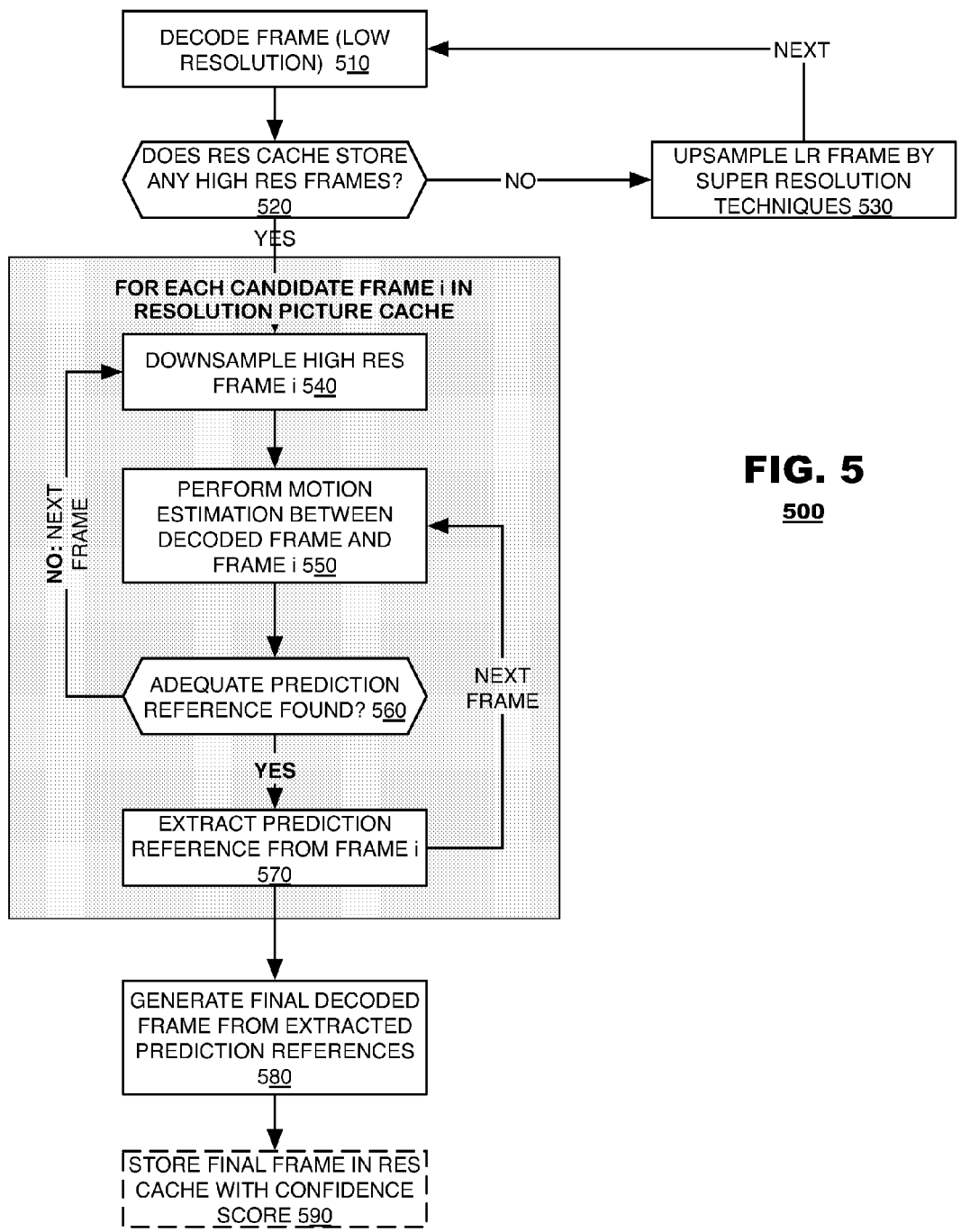
FIG. 5 illustrates a method according to another embodiment of the present invention.

FIG. 5 illustrates a method 500 according to an embodiment of the present invention. The method 500 may find application in post-processing of decoded low resolution frames to generate high resolution output frames. The method may begin following decoding of the low resolution frame (box 510). The method 500 may determine whether the resolution picture cache stores any high resolution frames for analysis (box 520). If not, the method 500 may attempt to generate a high resolution copy of the low resolution frame by another means, for example, super-resolution image reconstruction techniques (box 530) and may store the upsampled frame in the resolution cache. Thereafter, the method 500 may advance to decode of the next frame.

If the resolution picture cache stores high resolution frames for analysis, the method 500 may perform motion estimation searches between the decoded low resolution frame and the stored high resolution frame. In this embodiment, the method may consider each stored high resolution frame in order. The method may downsample a stored high resolution frame to a resolution corresponding to the resolution of the decoded low resolution frame (box 540) and may perform a motion estimation search between the downsampled frame and the decoded low resolution frame (box 550). The search may proceed on a block-by-block basis over a display area of the decoded low resolution frame. For each block, the method 500 may determine whether the downsampled high resolution frame provides an adequate prediction reference for the block (box 560). If so, a matching block of the source high resolution frame may be extracted from the resolution cache for use in blending (box 570). Thereafter, the method 500 may advance to box 540 for evaluation of another candidate frame from the resolution picture cache.

After the motion estimation analysis has considered all candidate frames in the reference picture cache, the method 500 may generate a final frame for the decoded frame (box 580). Blending may occur via any of the techniques identified above. In a first embodiment, the final decoded frame may be derived from an averaging or weighted average of the data extracted from the stored high resolution frames. In another embodiment, the final frame may be derived by blending an upsampled version of the decoded frame with extracted portions of the reference frames. The final frame will be high resolution frame, which may be rendered on a display as the decoded frame. Again, optionally, the final frame may be stored in the resolution picture cache for use in motion estimation for later decoded frames (box 590).

Block extraction from the high resolution frame may occur by scaling motion vectors obtained from the motion estimation search conducted with respect to the low resolution frame to a domain of the high resolution frame. Optionally, the scaling operation may be supported by a second motion estimation search that is localized to the matching region of the high resolution frame. In another embodiment, the motion estimation search may occur on high resolution reference frames that are filtered to reduce detail of the high resolution reference frames to an amount of detail found in the up-sampled decoded image.

The motion estimation search may be performed as a generalized search between the upsampled decoded frame and high resolution frames stored in the resolution cache. In an embodiment, the motion estimation search may be assisted by pixel block motion vectors provided in the decoded video data of the current frame, which identify a reference frame stored in the reference picture cache 153 (FIG. 1) and a location in the reference frame from which prediction data is to be extracted. In this embodiment, the motion estimation search (FIG. 5) may use the motion vectors to identify a corresponding block in the resolution picture cache 155 as an extraction block for use in resolution adaptation.

The techniques described above relating to development and use of confidence scores apply equally to the method of FIG. 5 in all respects.

The methods of FIGS. 2 and 5 both illustrate iterative operation performed sequentially over a number of frames stored in a resolution picture cache. Such iterative operation is illustrated in order to explain the operation and benefits of those embodiments. The processes of such embodiments can be performed in an iterative manner in some implementations. In other embodiments, operation of the present invention need not be performed iteratively over each stored frame sequentially. It is permissible to operate the methods in bulk fashion, for example, by downsampling all stored frames in a first operation (FIG. 5, box 540) and subsequently performing the motion estimation search (boxes 550-570) thereafter. The principles of the present invention find application with both implementations.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1 illustrates the components of video coders and decoders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders and decoders typically will include functional units in addition to those described herein, including buffers to store data throughout the coding pipelines illustrated and communication transceivers to manage communication with the communication network and the counterpart coder/decoder device. Such elements have been omitted from the foregoing discussion for clarity.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of changing resolution of video, comprising:
   decoding coded data of a current frame of the video to generate an initial decoded frame at a low resolution; and
   altering resolution of one of the initial decoded frame and candidate high resolution frames to a resolution of the other of the initial decoded frame and the candidate high resolution frames;
   after decoding operations are complete, for each candidate high resolution frame previously stored in a frame cache:
     performing a motion estimation search between the initial decoded frame and the respective candidate high resolution frame
       to identify a prediction reference block that matches content of a block of the initial decoded frame; and
     generating a final decoded frame by blending together, by a weighted averaging, contents of the initial decoded frame with matching content of the identified prediction reference block from the candidate frame;
       wherein said final decoded frame has a resolution that is higher than the initial decoded frame.

2. The method of claim 1, wherein the motion estimation is performed on each of a plurality of pixel blocks of the initial decoded frame.

3. The method of claim 2, wherein the pixel blocks are spatially non-overlapping.

4. The method of claim 2, wherein at least two pixel blocks spatially overlap.

5. The method of claim 1, wherein the identified prediction reference block of a candidate high resolution frame is weighted according to error estimate(s) generated by the motion estimation search.

6. The method of claim 1, wherein the identified prediction reference block of a candidate high resolution frame is weighted according to motion vector(s) generated by the motion estimation search.

7. The method of claim 1, wherein the identified prediction reference block of a candidate high resolution frame is weighted according to a confidence score that based on an estimate[s] of a visual quality of the initial decoded frame or of the identified prediction reference block and that is stored with the identified prediction reference block of the candidate high resolution frame.

8. The method of claim 1, wherein the blending further comprises blending DCT coefficients of the initial decoded frame and the identified prediction reference block of a candidate high resolution frame.

9. The method of claim 1, further comprising storing the blended data contents in the frame cache.

10. The method of claim 1, further comprising generating an estimate of a visual quality for the blended data contents based on a quality estimate obtained by the motion estimation, wherein the quality estimate is based on a level of residual coefficients that were generated following motion estimation.

11. The method of claim 1, further comprising generating an estimate of a visual quality for the blended data contents based on a type of predictive coding that was applied to the initial decoded frame.

12. The method of claim 1, further comprising generating an estimate of a visual quality for the blended data content based on a quantization assigned to the initial decoded frame.

13. The method of claim 1, further comprising: wherein the altering comprises converting said the initial decoded frame to the high resolution before performing said motion estimation search.

14. The method of claim 1, further comprising: wherein the altering comprises converting each candidate high resolution frame to the low resolution before performing said motion estimation search.

15. A non-transitory computer readable medium storing program instructions that, when executed by a processing device, cause the device to:
   decode coded data of a current frame of video to generate an initial decoded frame at a low resolution;
   alter resolution of one of the initial decoded frame and candidate high resolution frames to a resolution of the other of the initial decoded frame and the candidate high resolution frames;
   after decoding operations are complete, for each of a plurality of stored high resolution frames:
   perform a motion estimation search between the initial decoded frame and each of the respective candidate high resolution frame
     to identify a prediction reference block that matches content of a block from the initial decoded frame; and
   generate final frame data of the initial decoded frame by blending together,
     by a weighted averaging contents of the of the initial decoded frame with the matching content of the identified prediction reference block from the candidate frame;
     wherein said final frame data has a resolution that is higher than the initial decoded frame.

16. The medium of claim 15, wherein the motion estimation is performed on each of a plurality of pixel blocks of the initial decoded frame.

17. The medium of claim 16, wherein the pixel blocks are spatially non-overlapping.

18. The medium of claim 16, wherein at least two pixel blocks spatially overlap.

19. The medium of claim 15, wherein the identified block is weighted according to error estimate(s) generated by the motion estimation search.

20. The medium of claim 15, wherein the identified block is weighted according to motion vector(s) generated by the motion estimation search.

21. The medium of claim 15, wherein the identified block is weighted based on an estimate[s] of a visual quality of the initial decoded frame or of the identified prediction reference block and that is stored with the identified prediction reference block of a candidate high resolution frame.

22. The medium of claim 15, wherein the blending further comprises blending DCT coefficients of the initial decoded frame and the identified prediction reference block of a stored high resolution frame.

23. The medium of claim 15, further comprising storing the final frame data in a cache that stores the stored high resolution frames.

24. The medium of claim 15, further comprising generating a confidence score for the final frame data based on a quality estimate obtained by the motion estimation.

25. An apparatus for changing resolution of video, comprising:
- a memory device for storing frames of video data; and
- a processor configured to change the resolution of a current frame of video data by:
  - decoding coded data of the current frame to generate an initial decoded frame at a low resolution;
  - altering resolution of one of the initial decoded frame and candidate high resolution frames to a resolution of the other of the initial decoded frame and the candidate high resolution frames;
  - after decoding operations are complete, for each candidate high resolution frame previously stored in the memory device:
    - performing a motion estimation search between the initial decoded frame and the respective candidate high resolution frame
    - to identify a prediction reference block that matches content of a block from the initial decoded frame; and
    - generating a final decoded frame by blending together,
    - by a weighted averaging contents of the initial decoded frame with the matching content of the identified prediction reference block from the candidate frame;
  - wherein said final decoded frame has a resolution that is higher than the initial decoded frame.

26. The apparatus of claim 25, wherein the motion estimation is performed on each of a plurality of pixel blocks of the initial decoded frame.

27. The apparatus of claim 26, wherein the pixel blocks are spatially non-overlapping.

28. The apparatus of claim 26, wherein at least two pixel blocks spatially overlap.

29. The apparatus of claim 25, wherein the initial decoded frame and the identified prediction reference blocks of the candidate high resolution frames are weighted according to error estimate(s) generated by the motion estimation search.

30. The apparatus of claim 25, wherein the initial decoded frame and the identified prediction reference blocks of the candidate high resolution frames are weighted according to motion vector(s) generated by the motion estimation search.

31. The apparatus of claim 25, wherein the initial decoded frame and the identified prediction reference blocks of the candidate high resolution frames are weighted according to confidence score stored with matching frame data.

32. The apparatus of claim 25, wherein the blending comprises blending DCT coefficients of the initial decoded frame with an identified prediction reference block of a candidate high resolution frame.

33. The apparatus of claim 25, further comprising storing the final frame data in the memory device.

34. The apparatus of claim 25, further comprising generating a confidence score for the final frame data based on a quality estimate obtained by the motion estimation.

* * * * *